United States Patent [19]
Oda et al.

[11] Patent Number: 4,461,682
[45] Date of Patent: Jul. 24, 1984

[54] ION EXCHANGE MEMBRANE CELL AND ELECTROLYTIC PROCESS USING THEREOF

[75] Inventors: Yoshio Oda; Takeshi Morimoto; Toshiya Matsubara, all of Yokohama, Japan

[73] Assignee: Asahi Glass Company Ltd., Tokyo, Japan

[21] Appl. No.: 505,900

[22] Filed: Jun. 22, 1983

Related U.S. Application Data

[63] Continuation of Ser. No. 288,684, Jul. 31, 1981, abandoned.

[30] Foreign Application Priority Data

Jul. 31, 1980 [JP] Japan .................. 55-104284

[51] Int. Cl.³ .................. C25B 1/46; C25B 13/02; C25B 13/08
[52] U.S. Cl. .................. 204/98; 204/128; 204/252; 204/283; 204/296
[58] Field of Search .................. 204/98, 128, 283, 296, 204/252

[56] References Cited

U.S. PATENT DOCUMENTS

| | | | |
|---|---|---|---|
| 3,940,916 | 3/1976 | Grot | 57/238 |
| 4,151,053 | 4/1979 | Seko et al. | 204/98 |
| 4,191,618 | 3/1980 | Coner et al. | 204/128 |
| 4,251,333 | 2/1981 | Suhara et al. | 204/98 |
| 4,268,365 | 5/1981 | Iijima et al. | 204/98 |
| 4,272,353 | 6/1981 | Lawrance et al. | 204/296 |
| 4,316,781 | 2/1982 | Seita et al. | 204/98 |
| 4,323,434 | 4/1982 | Yoshida et al. | 204/98 |
| 4,340,452 | 7/1982 | de Noba | 204/283 |

*Primary Examiner*—Andrews R. L.
*Attorney, Agent, or Firm*—Oblon, Fisher, Spivak, McClelland & Maier

[57] ABSTRACT

An electrolytic cell comprises an anode and a cathode which are partitioned by an ion exchange membrane having at least one roughened surface which contacts with or closes in a distance of up to 20 mm to a corresponding electrode.

10 Claims, 4 Drawing Figures

ION EXCHANGE MEMBRANE CELL AND ELECTROLYTIC PROCESS USING THEREOF

This application is a continuation of prior application Ser. No. 288,684, filed on July 31, 1981, now abandoned.

BACKGROUND OF THE INVENTION:

1. Field of the Invention:

The present invention relates to electrolytic cells containing ion exchange membranes. More particularly, it relates to electrolytic cells suitable for electrolysis of water or aqueous solutions of acids, bases, alkali metal sulfates, alkali metal carbonates, or alkali metal halides and to a process for electrolysis using the same.

2. Description of the Prior Art:

An electroconductive material is referred to as an electrically conductive material. An non-electroconductive material is referred to as an electrically non-conductive material.

As a process for producing an alkali metal hydroxide by an electrolysis of an aqueous solution of an alkali metal chloride, a diaphragm method has been mainly employed instead of the mercury method to prevent pollution.

It has been proposed to use an ion exchange membrane in place of asbestos as a diaphragm to produce an alkali metal hydroxide by electrolyzing an aqueous solution of an alkali metal chloride so as to obtain an alkali metal hydroxide having high purity and high concentration.

On the other hand, it has been proposed to save energy in the world. From the viewpoint, it has been required to minimize a cell voltage in such technology.

It has been proposed to reduce a cell voltage by improvements in the materials, compositions and configurations of the anode and cathode and compositions of an ion exchange membrane including the type of ion exchange group.

It has been proposed to attain an electrolysis by the so called solid polymer electrolyte (SPE) type electrolysis of alkali metal chloride wherein a cation exchange membrane of a fluorinated polymer is bonded with gas-liquid permeable catalytic anode on one surface and gas-liquid permeable catalytic cathode on the other surface of the membrane (U.S. Pat. No. 4,224,121 and U.S. Pat. No. 4,210,501 and U.S. Pat. No. 4,214,958 and U.S. Pat. No. 4,217,401).

This electrolytic method is remarkably advantageous as an electrolysis at a lower cell voltage because an electric resistance caused by an electrolyte and an electric resistance caused by bubbles of hydrogen gas and chlorine gas generated in the electrolysis, can be remarkably decreased which have been considered to be difficult to reduce in the conventional electrolysis.

The anode and the cathode in this electrolytic cell are bonded on the surface of the ion exchange membrane to be embedded partially. The gas and the electrolyte solution are readily permeated so as to easily remove, from the electrode, the gas formed by the electrolysis at the electrode layer contacting with the membrane. Such porous electrode is usually made of a thin porous layer which is formed by uniformly mixing particles which act as an anode or a cathode with a binder, further graphite or the other electric conductive material. However, it has been found that when an electrolytic cell having an ion exchange membrane bonded directly to the electrode is used, the anode in the electrolytic cell is brought into contact with hydroxyl ion which is reversely diffused from the cathode compartment, and accordingly, both of chlorine resistance and an alkaline resistance for anode material are required and an expensive material must be used. When the electrode layer is bonded to the ion exchange membrane, gas is formed by the electrode reaction at the electrode membrane interface and deformation phenomenon of the ion exchange membrane occurs which causes the characteristics of the membrane to deteriorate. As a result it is difficult to maintain the cell stable for long periods. In such electrolytic cell, the current collector for electric supply to the electrode layer bonded to the ion exchange membrane should closely contact with the electrode layer. When a firm contact is not obtained, the cell voltage may be increased. The cell structure for securely contacting the current collector with the electrode layer is disadvantageously complicated.

SUMMARY OF THE INVENTION:

It is an object of the present invention to provide a new electrolysis technique without the above-mentioned disadvantages and to reduce cell voltage as much as possible.

The foregoing and other objects of the present invention have been attained by providing a novel electrolytic cell which comprises an anode and a cathode which are partitioned by an ion exchange membrane having at least one roughened surface which contacts with or is spaced close to a corresponding electrode.

DETAILED DESCRIPTION OF THE PREFERRED EMBODIMENTS:

The electrolytic cell has an ion exchange membrane partitioning an anode and a cathode. The ion exchange membrane has at least one roughened surface which faces either the anode or a cathode and the roughened surface contacts with or is spaced close to the corresponding electrode in the electrolytic cell. When an alkali metal hydroxide and chlorine are produced by electrolyzing an aqueous solution of an alkali metal chloride in this electrolytic cell, the cell voltage can be remarkably reduced without the above-mentioned disadvantages. The roughened surface on the ion exchange membrane used in the present invention has fine concavo-convex structure (referred to concavo-convex s. hereinafter) formed on the membrane.

The degree of reduction of the cell voltage depends upon a depth and height, configuration, and distribution of concavo-convex s. formed on the surface of the ion exchange membrane. The maximum effect for reducing the cell voltage is given by selecting the suitable combination of the above element of the concavo-convex s.

The conventional ion exchange membrane can be fabricated by various processes such as a press-molding process, a rolling process, an extrusion molding process or a solution casting process. The resulting ion exchange membrane has both smooth surfaces having no fine concavo-convex s. Even though an ion exchange membrane having concavo-convex s. on the surface may have existed, it has not been found that the cell voltage is remarkably reduced by placing the ion exchange membrane having roughened surface in contact with or close to the corresponding electrode in comparison with the ion exchange membrane having smooth surfaces.

Figure 3:
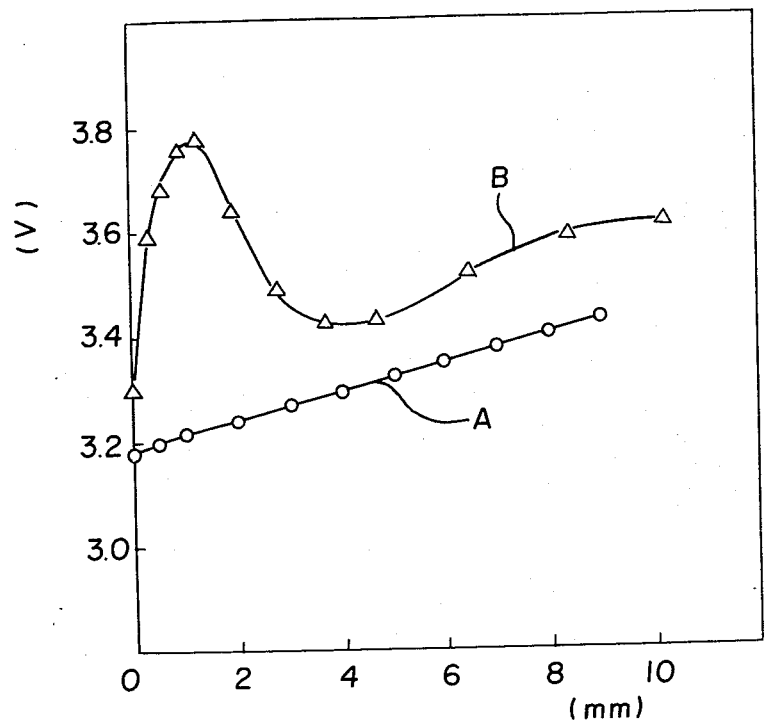
FIG. 3 is a graph showing the relation of a distance between an ion exchange membrane and a corresponding electrode in an electrolytic cell and a cell voltage.

In the present invention, the distance between the ion exchange membrane and the electrode is important factor. As shown in FIG. 3, when the distance between the roughened surface of the ion exchange membrane and the corresponding electrode is varied to get close to or in contact with the corresponding electrode, there is found a special phenomenon which could not be found in the case of a conventional ion exchange membrane having no roughened surface.

In the case of the conventional ion exchange membrane, the cell voltage decreases by approaching the corresponding electrode to the membrane to certain distance as shown by the curve B in FIG. 3 but the cell voltage increases by further approach. This may be an increase of the cell voltage caused by residence of a gas generated by the electrolysis between the membrane and the electrode. The cell voltage further decreases by approaching the electrode to contact with the membrane. On the contrary, when the electrode approaches to the membrane having the roughened surface to close to it, the special phenomenon is found as shown by A in FIG. 3 and is different from the phenomenon shown by B. The cell voltage smoothly decreases without any increase. When the electrode approaches for the distance of increase in the case of B (about 3.5 mm in FIG. 3), the cell voltage further decreases in the case of A in FIG. 3. In view of the special phenomenon mentioned above, the cell voltage of the electrolytic cell of the present invention is remarkably low to be industrially effective, and moreover, the cell voltage does not increase to maintain stable cell voltage even though the distance between the membrane and the electrode is departed by variation of the gas pressure during the operation of the electrolytic cell in comparison with the electrolytic cell having the conventional membrane having smooth surfaces.

Figure 4:
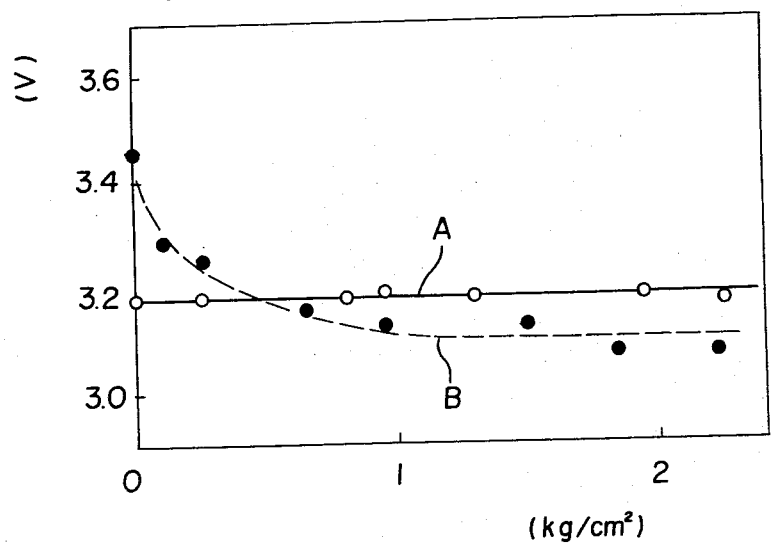
FIG. 4 is a graph showing a relation of a contact pressure of a corresponding electrode to an ion exchange membrane in an electrolytic cell as one embodiment and a cell voltage.

The advantage of the electrolytic cell of the present invention is also found in the graph of FIG. 4.

In FIG. 4, the curve A shows the change of the cell voltage under the variation of the contact pressure of the electrode to the membrane in the electrolytic cell of the present invention; and the curve B shows the similar variation in the SPE type electrolytic cell mentioned above wherein the cell voltage can be fairly reduced.

As it is clear from the comparison, the cell voltage is constant even though the contact pressure is changed in the curve A whereas the cell voltage remarkably increases depending upon decrease of the contact pressure in the curve B.

In the electrolytic cell of the present invention, it is unnecessary to contact the electrode with the membrane under high pressure. This is remarkably advantageous in view of a design of an electrolytic cell. Moreover, damage of the ion exchange membrane is small which increases the life of the membrane.

The roughened surface of the ion exchange membrane used in the present invention has fine concavo-convex s. formed on the membrane. The fine concavo-convex s. have an average depth or height ranging from 0.01 to 30$\mu$ preferably 0.05 to 10$\mu$. The average depth or height is the depth or height from the central level of the concavo-convex s. The concavo-convex s. have preferably an average number ranging from 1 to $10^{13}$ per mm$^2$ especially 10 to $10^{12}$ per mm$^2$. The configuration of the concavo-convex can be a desired form such as circular or rectangular form and the sectional view can be a desired form such as wedge, spherical or cylindrical form. The concavo-convex s. of the ion exchange membrane are formed at least one surface of the ion exchange membrane. The effect for reducing the cell voltage is found in both cases of one surface and both surfaces.

Various processes can be applied for forming the fine concavo-convex s. on the surface of the ion exchange membrane. Suitable processes include sand blasting; brushing by a wire brush; grinding with sand paper; a process of use of a die having concavo-convex s. surface in an extrusion molding of a membrane; passing a membrane between embossing rolls; heat-pressing a membrane superposed by a woven fabric or paper; surface etching with metallic sodium; bonding a mesh or nonwoven fabric made of an ion exchange resin on a surface; electric arcing; ultraviolet irradiation and treating by gas flame or hot air. The roughening process is not restricted to the ones mentioned above.

The following process is preferable in view of easy control of a configuration of concavo-convex s. on the surface.

A grain layer having relatively hard, and small grains is brought into contact with an ion exchange membrane preferably by a heat-press and then, the grain layer is removed to form the concavo-convex s. In this process, the configuration of concavo-convex s. formed on the surface of the membrane can be controlled depending upon the size of the grains and the degree of heat and pressure. The grains preferably have particle diameters ranging from 0.01 to 100$\mu$ especially from 0.1 to 20$\mu$ and have hardness enough to form the fine concavo-convex s. on the surface of the membrane. Various grains can be selected depending upon the kind of a next process for removing the grain layer and can be a desired powder which does not cause a damage of the ion exchange membrane, such as ion group metals (iron, nickel, cobalt etc.), metals of the IV-A group in the periodic table (tin, germanium etc.), aluminum, zinc, antimony, and bismuth and alloys thereof.

In order to form the grain layer on the ion exchange surface, a desired process can be employed and for example, the process for forming a grain layer of particles having electrochemical activity described in U.S. Pat. No. 4,224,121 can be selected. The grains are mixed into a slurry in a desired medium such as water and alcohols, if necessary with a binder such as fluorinated polymers including polytetrafluoroethylene, polyhexafluoroethylene; or a water soluble binder such as carboxymethylcellulose and methylcellulose. The slurry is filtered to form a cake of the grain layer on the filter and the resulting cake is coated on the membrane or the slurry in a pasty form is directly coated on the membrane by a screen printing process etc. The grain layer is heat-pressed on the membrane at 80° to 220° C. under a pressure of 1 to 150 kg/cm², preferably so as to partially penetrate the grains into the membrane. The grain layer preferably has a porosity ranging from 10 to 99% and a thickness ranging 0.01 to 200μ. The grain layer on the ion exchange membrane is removed from the membrane by a desired mechanical or chemical process. For example, the ion exchange membrane having the grain layer on it is dipped in a liquid medium for swelling the membrane such as an acid solution, an alkaline solution or an alcohol whereby the membrane is swollen and the grain layer is peeled off by the difference of swelling degrees of the grain layer and the membrane.

In the other process, the grain layer is formed by grains having high solubility to a specific solvent and the grain layer is formed on the membrane and then the grain layer is dipped in said solvent to dissolve the grain. For example, when the grain layer is formed by the grains made of zinc, aluminum, tin, zirconium or antimony, the grains can be dissolved by dipping it in an aqueous solution of an alkali metal hydroxide. When the grain layer is formed by the grains made of chromium, cobalt, tin iron, nickel, zinc or aluminum, the grains can be dissolved by dipping it in an acid.

When the fine concavo-convex s. are formed on the ion exchange membrane by sand blasting, brushing, sand paper etc., any desired known process can be employed. In the process, the desired additional treatment such as a heating of the ion exchange membrane can be also combined.

The cation exchange membrane on which the fine concavo-convex x. is formed can be made of a polymer having cation exchange groups such as carboxylic acid groups, sulfonic acid groups, phosphoric acid groups and phenolic hydroxy groups. Suitable polymers include copolymers of a vinyl monomer such as tetrafluoroethylene and chlorotrifluoroethylene and a perfluorovinyl monomer having an ion-exchange group such as sulfonic acid group, carboxylic acid group and phosphoric acid group or a reactive group which can be converted into the ion-exchange group. It is also possible to use a membrane of a polymer of trifluoroethylene in which ion-exchange groups such as sulfonic acid group are introduced or a polymer of styrene-divinyl benzene in which sulfonic acid groups are introduced.

The cation exchange membrane is preferably made of a fluorinated polymer having the following units $$\text{---}(CF_2\text{---}CXX')\text{---} \quad (M \text{ mole \%}) \quad (M)$$

$$\text{---}(CF_2\text{---}CX)\text{---} \quad (N \text{ mole \%}) \quad (N)$$
$$\qquad\quad |$$
$$\qquad\quad Y\text{---}A$$

wherein X represents fluorine, chlorine or hydrogen atom or $-CF_3$; X' represents X or $CF_3(CH_2)_m$; m represents an integer of 1 to 5.

The typical examples of Y have the structures bonding A to a fluorocarbon group such as

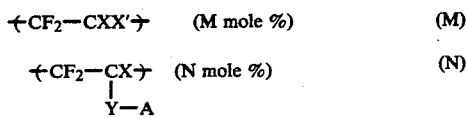

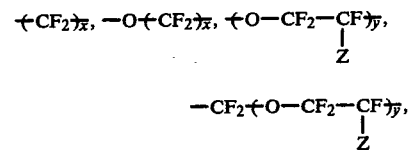

-continued

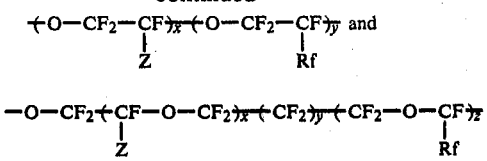

x, y and z respectively represent an integer of 1 to 10; Z and Rf represent $-F$ or a $C_1$-$C_{10}$ perfluoroalkyl group; and A represents $-COOM$ or $-SO_3M$, or a functional group which is convertible into $-COOM$ or $-SO_3M$ by a hydrolysis or a neutralization such as $-CN$, $-COF$, $-COOR_1$, $-SO_2F$ and $-CONR_2R_3$ or $-SO_2NR_2R_3$ and M represents hydrogen or an alkali metal atom; $R_1$ represents a $C_1$-$C_{10}$ alkyl group; $R_2$ and $R_3$ represent H or a $C_1$-$C_{10}$ alkyl group.

It is preferable to use a fluorinated cation exchange membrane having an ion exchange group content of 0.5 to 4.0 miliequivalence/gram dry polymer especially 0.8 to 2.0 miliequivalence/gram dry polymer which is made of said copolymer.

In the cation exchange membrane of a copolymer having the units (M) and (N), the ratio of the units (N) is preferably in a range of 1 to 40 mol % preferably 3 to 25 mol %.

The cation exchange membrane used in this invention is not limited to one kind of the polymer. It is possible to use a laminated membrane made of two kinds of the polymers having lower ion exchange capacity in the cathode side, a membrane having a weak acidic ion exchange group such as carboxylic acid group in the cathode side and a strong acidic ion exchange group such as sulfonic acid group in the anode side.

The cation exchange membrane used in the present invention can be fabricated by blending a polyolefin such as polyethylene, polypropylene, preferably a fluorinated polymer such as polytetrafluoroethylene and a copolymer of ethylene and tetrafluoroethylene.

The membrane can be reinforced by supporting said copolymer on a fabric such as a woven fabric or a net, a fibril, a nonwoven fabric or a porous film made of said polymer or wires, a net or a perforated plate made of a metal. The weight of the polymers for the blend or the support is not considered in the measurement of the ion exchange capacity.

The thickness of the membrane is preferably 20 to 500 microns especially 50 to 400 microns.

The concavo-convex s. are formed on the surface of the ion exchange membrane preferably both in the anode side and in the cathode side. In forming the concavo-convex s. on the membrane a form of ion exchange group which is not decomposed, for example, an acid or ester form in the case of carboxylic acid group and $-SO_2F$ group in the case of sulfonic acid group are suitable.

In the electrolytic cell of the present invention, various electrodes can be used, for example, foraminous electrodes having openings such as a porous plate, a screen or an expanded metal are preferably used. The electrode having openings is preferably an expanded metal with openings of a major length of 1.0 to 10 mm preferably 1.0 to 7 mm and a minor length of 0.5 to 10 mm preferably 0.5 to 4.0 mm, a width of a mesh of 0.1 to 2.0 mm preferably 0.1 to 1.5 mm and a ratio of opening area of 20 to 95% preferably 30 to 90%.

A plurality of plate electrodes can be used in layers. In the case of a plurality of electrodes have different openings area being used in layers, the electrode having smaller opening area is placed close to the membrane.

The anode is usually made of a platinum group metal or alloy, a conductive platinum group metal oxide or a conductive reduced oxide thereof.

The cathode is usually a platinum group metal or alloy, a conductive platinum group metal oxide or an iron group metal or alloy.

The platinum group metal can be Pt, Rh, Ru, Pd, Ir. The cathode is iron, cobalt, nickel, Raney nickel, stabilized Raney nickel, stainless steel, a stainless steel treated by etching with a base (U.S. Ser. No. 879751) Raney nickel plated cathode (U.S. Pat. No. 4,170,536 and No. 4,116,804) nickel rhodanate plated cathode (U.S. Pat. No. 4,190,514 and U.S. Pat. No. 4,190,516).

When the electrode having opening is used, the electrode can be made of the materials for the anode or the cathode by itself. When the platinum metal or the conductive platinum metal oxide is used, it is preferable to coat such material on an expanded metal made of a valve metal.

The distance between the electrode and the ion exchange membrane in the electrolytic cell is the important factor. In order to attain the purpose of the present invention, the electrode is placed to close to or contact with the roughened surface of the ion exchange membrane in the cathode side and/or the anode side. The distance between the electrode and the membrane is preferably up to 2.0 mm especially up to 1.0 mm. It is optimum to contact the electrode with the membrane. When the distance between the electrode and the membrane is more than said limit, the cell voltage disadvantageously increases depending upon the increase of the distance. Various methods of contacting electrode with the membrane can be used.

When the electrode contacts with the ion exchange membrane, the contact pressure can be selected as desired. In view of the adverse effect to the membrane, the contact pressure is preferably up to 10 kg/cm$^2$ especially 5 kg/cm$^2$. The cell voltage of the electrolytic cell of the present invention is not substantially changed depending upon the contact pressure. This is one of the characteristic of the cell.

When the concavo-convex s. are formed on only one surface of the membrane, the electrode at the other side of ion exchange membrane having roughed surface can be placed at any desired distance. The electrodes having opening such as the porous plate, the mesh or the expanded metal can be placed in contact with the membrane or in leaving space to the membrane. The electrodes can be also porous layers which act as an anode or a cathode. The porous layers as the electrodes which are bonded to the ion exchange membrane are disclosed in U.S. Pat. No. 4,224,121, U.S. Pat. No. 4,210,501, U.S. Pat. No. 4,214,958 and U.S. Pat. No. 4,217,401.

The electrolytic cell used in the present invention can be monopolar or bipolar type in the above-mentioned structure. The electrolytic cell used in the electrolysis of an aqueous solution of an alkali metal chloride, is made of a material being resistance to the aqueous solution of the alkali metal chloride and chlorine such as valve metal like titanium in the anode compartment and is made of a material being resistant to an alkali metal hydroxide and hydrogen such as iron, stainless steel or nickel in the cathode compartment.

Figure 1:
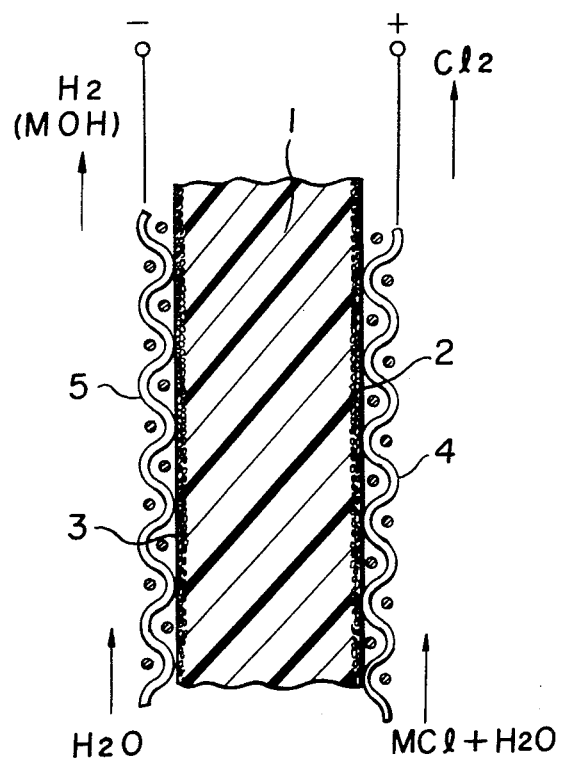
FIG. 1 is a sectional view of one embodiment of the electrolytic cell which shows principal of the present invention.

The principle of the ion exchange membrane electrolytic cell of the present invention is shown in FIG. 1 wherein the reference numeral (1) designates the ion exchange membrane; (2), (3) respectively designate concavo-convex s. in the anode side and in the cathode side, which are respectively formed on the ion exchange membrane. The anode (4) and the cathode (5) are respectively brought into contact with the porous layers and the anode (4) and the cathode (5) are respectively connected to the positive power source and the negative power source. In the electrolysis of the alkali metal chloride, an aqueous solution of an alkali metal chloride (MCl+H$_2$O) was fed into the anode compartment whereas water or a diluted aqueous solution of an alkali metal hydroxide is fed into the cathode compartment. In the anode compartment, chlorine is formed by the electrolysis and the alkali metal ion (M+) is moved through the ion exchange membrane. In the cathode compartment, hydrogen is generated by the electrolysis and hydroxyl ion is also formed. The hydroxyl ion reacts with the alkali metal ion moved from the anode to produce the alkali metal hydroxide.

Figure 2:
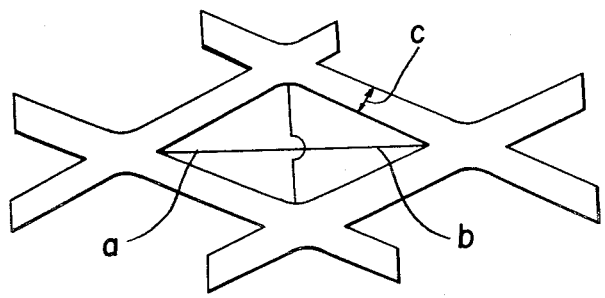
FIG. 2 is a plan view of an expanded metal as one embodiment of the electrode used in the electrolytic cell of the present invention.

FIG. 2 is a partial plane view of the expanded metal as the electrode of the electrolytic cell wherein a designates a major length; b designates a minor length and c designates a width of the wire.

In the present invention, the process condition for the electrolysis of an aqueous solution of an alkaline metal chloride can be the known condition in the prior arts.

For example, an aqueous solution of an alkali metal chloride (2.5 to 5.0 Normal) is fed into the anode compartment and water or a dilute solution of an alkali metal hydroxide is fed into the cathode compartment and the electrolysis is preferably carried out at 80° to 120° C. and at a current density of 10 to 100 A/dm$^2$.

The alkali metal hydroxide having a concentration of 20 to 50 wt. % is produced. In this case, the presence of heavy metal ion such as calcium or magnesium ion in the aqueous solution of an alkali metal chloride causes deterioration of the ion exchange membrane, and accordingly it is preferable to minimizes the content of the heavy metal ion. In order to prevent the generation of oxygen on the anode, it is preferable to feed an acid in the aqueous solution of an alkali metal chloride.

Although the electrolytic cell for the electrolysis of an alkali metal chloride has been illustrated, the electrolytic cell of the present invention can be used for the electrolysis of water, for example, using alkali metal hydroxide having a concentration of preferably 10 to 30 weight percent, a halogen acid (HCl, HBr) an alkali metal sulfate, an alkali metal carbonate etc.

The present invention will be further illustrated by certain examples and references which are provided for purposes of illustration only and are not intended to limit the present invention.

EXAMPLE 1

A paste was prepared by thoroughly mixing 5 wt. parts of aluminum powder having a particle diameter of up to 25$\mu$ with 10 wt. parts of an aqueous solution of methylcellulose at a concentration of 2 wt. % and then, adding 2 wt. parts of isopropanol and 1 wt. part of cyclohexanol and kneading the mixture. The paste was printed by a screen printing process, in a size of 10 cm×10 cm on one surface of an ion exchange membrane of a copolymer of $CF_2=CF_2$ and $CF_2=CFO(CF_2)_3COOCH_3$ having an ion exchange capacity of 1.43 meq/g dry polymer and a thickness of 210μ, by using a stainless steel screen having a mesh of 200 and a thickness of 60μ, and a printing plate having a screen mask having a thickness of 8μ and a polyurethane squeezer which were placed on the membrane. The printed layer formed on one surface of the ion exchange membrane was dried in air to solidify the paste. On the other surface, the aluminum powder was also screen printed by the same process. Then, the printed layers were heat-pressed on the both surfaces of the ion exchange membrane at 140° C. under a pressure of 30 kg/cm². Each resulting aluminum layer had a thickness of 20μ and a porosity of 68% and contained aluminum powder at a ratio of 1 mg/cm². Then, the ion exchange membrane having the aluminum layers was dipped into 25% aqueous solution of sodium hydroxide at 90° C. to dissolve aluminum powder and methylcellulose and the ion exchange membrane was further dipped in 25% aqueous solution of sodium hydroxide at 90° C. for 16 hours to hydrolyze the ion exchange membrane. The resulting ion exchange membrane had concavo-convex s. having an average depth of 3μ and an average number of $10^6$ per mm² on both surfaces. The ion exchange membrane was brought into contact with an anode of titanium expanded metal (minor axis of 2.5 mm and major axis of 5 mm) coated with a solid solution of ruthenium oxide, iridium oxide and titanium oxide, and a cathode of nickel expanded metal (minor axis of 2.5 mm; major axis of 5 mm) under a pressure of 1.0 kg/cm².

An electrolysis was carried out by feeding 5N—NaCl aqueous solution into an anode compartment and feeding water into a cathode compartment while maintaining 4 normal of a concentration of NaCl in the anode compartment and 35 wt. % of a concentration of NaOH in a catholyte at 90° C. The result is as follows:

| Current density (A/dm²) | Cell voltage (V) |
| --- | --- |
| 20 | 2.95 |
| 40 | 3.28 |

A current efficiency for producing sodium hydroxide at a current density of 40 A/dm² was 94.0%. The electrolysis continued for 1 month at a current density of 40 A/dm². The cell voltage was substantially kept in constant.

Comparative Test 1:

In the electrolytic cell of Example 1, the anode was brought into contact with the ion exchange membrane; however, the cathode was departed from the membrane by a spacer to change the distance between the cathode and the membrane, and an 52% NaOH etched (150° C.) stainless steel (SUS 364) disclosed in U.S. Pat. No. 4,255,247 was used as an cathode. Each electrolysis was carried out at 40 A/dm² under the condition maintaining each distance. After three months operation each cell voltage was measured. The relation of the distance between the cathode and the membrane and the cell voltage is shown by the curve A in FIG. 3.

As a reference, each electrolysis was carried out under the same condition for three months except using the non-treated ion exchange membrane having smooth surfaces. The relation is shown by the curve B in FIG. 3. The difference between the curve A and curve B is clearly found and was already explained before.

Comparative Test 2:

Each electrolysis was carried out in the electrolytic cell of Example 1 at 40 A/dm² except varying a contact pressure of the electrodes to the ion exchange membrane and using the alkalietched stainless steel cathode of the comparative test 1. After three months operation each cell voltage was measured. The relation is shown by the curve A in FIG. 4.

On the other hand, each electrolysis was carried out under the same condition except using SPE type ion exchange membrane. The relation is shown by the curve B in FIG. 4. The condition of the electrolysis was the same as the above. The SPE type membrane having the anode layer containing RuO—IrO (3:1) in anode side and the cathode layer containing Ru black was produced by the method disclosed in European Pat. No. 25644. The difference between the curve A and the curve B in FIG. 4 and the advantages of the curve A of the present invention are already explained before.

EXAMPLE 2

In accordance with the process of Example 1 except using an ion exchange membrane (A) having only one roughened surface in the anode side or an ion exchange membrane (B) having only one roughened surface in the cathode side, each electrolysis was carried out for 3 months and the characteristics were measured. The results are as follows.

| Ion exchange membrane | Current density (A/dm²) | Cell voltage (V) | Current efficiency (%) |
| --- | --- | --- | --- |
| A | 20 | 3.12 | 94.5 |
| A | 40 | 3.46 | 94.0 |
| B | 20 | 3.10 | 93.0 |
| B | 40 | 3.44 | 92.5 |

EXAMPLE 3

In accordance with the process of Example 1 except using zinc powder instead of aluminum powder, the ion exchange membrane was treated by a zinc powder layer and an electrolysis was carried out. The results is as follows:

| Current density (A/dm²) | Cell voltage (V) |
| --- | --- |
| 20 | 2.96 |
| 40 | 3.30 |

A current efficiency for producing sodium hydroxide at a current density of 40 A/dm² was 93.5%. The electrolysis continued for 1 month at a current density of 40 A/dm². The cell voltage was substantially kept in constant.

EXAMPLE 4

In accordance with the process of Example 1 except using the ion exchange membrane having both roughened surfaces and maintaining each distance between the ion exchange membrane and the anode or the cathode for 1 mm, an electrolysis was carried out. The result is as follows:

| Current density (A/dm²) | Cell voltage (V) |
| --- | --- |
| 20 | 2.99 |
| 40 | 3.35 |

A current efficiency for producing sodium hydroxide at a current density of 40 A/dm² was 94.5%. The electrolysis continued for 1 month at a current density of 40 A/dm$^2$. The cell voltage was substantially kept in constant.

EXAMPLE 5

A cation exchange of $CF_2=CF_2$ and $CF_2=CFOCF_2CF(CF_3)O(CF_2)_2SOF$ having an amine-treated surface in the cathode side which has an ion exchange capacity of 0.67 meq/g dry polymer was treated by a sand brast process by brasting alumina powder having up to 400 mesh under an injection air pressure of 1 kg/cm$^2$ from a distance of 20 cm for 2 min. on both surfaces of the membrane. The ion exchange membrane was hydrolyzed under the condition of Example 1.

In accordance with the process of Example 1 except using the treated ion exchange membrane, an electrolysis was carried out. The result is as follows:

| Current density (A/dm$^2$) | Cell voltage (V) |
|---|---|
| 20 | 3.18 |
| 40 | 3.42 |

A current efficiency for producing sodium hydroxide at a current density of 40 A/dm$^2$ was 86%. The electrolysis continued for 1 month. The cell voltage did not increase.

EXAMPLE 6

The ion exchange membrane of Example 1 was dipped in 25% NaOH aqueous solution at 90° C. for 16 hours to hydrolyze it and then, both surfaces of the membrane were worn by a sand paper (#240). On the all surfaces, fine concavo-convex s. having an average depth of 2$\mu$ and an average width of 8$\mu$ were formed.

In accordance with the process of Example 1 except using the treated ion exchange membrane, an electrolysis was carried out. The results is as follows:

| Current density (A/dm$^2$) | Cell voltage (V) |
|---|---|
| 20 | 2.98 |
| 40 | 3.33 |

A current efficiency for producing sodium hydroxide at a current density of 40 A/dm$^2$ was 94.0. The electrolysis continued for 1 month. The cell voltage did not increase.

We claim:

1. An electrolytic cell which comprises: an anode and a cathode which are partitioned by an ion exchange membrane having both surfaces roughened, said surface roughening being defined by a fine concavo-convex structure wherein the average depth (heighth) of said structure ranges from 0.01 to 30$\mu$ with the average number of surface roughening concavo-convex structures ranging from 1 to 10$^{13}$ per mm$^2$, and wherein said anode contacts one of said membrane roughened surfaces and said cathode contacts the opposing membrane roughened surface.

2. The electrolytic cell of claim 1 wherein the anode and cathode are brought into contact with said roughened membrane surfaces at a pressure of up to 10 kg/cm$^2$.

3. A process for electrolyzing an aqueous alkali metal chloride solution which comprises electrolyzing said solution in the electrolytic cell of claim 1.

4. The electrolytic cell according to claim 1 or 2, wherein said roughened surfaces of said ion exchange membrane are formed by concavo-convex structures having an average depth or height ranging from 0.05 to 10$\mu$ at an average number of 10 to 10$^{12}$ per mm$^2$ of the surface area.

5. The electrolytic cell according to claim 1 or 2, wherein said ion exchange membrane is a cation exchange membrane of a fluorinated polymer having sulfonic acid groups, carboxylic acid groups or phosphoric acid groups.

6. The process according to claim 3, wherein said roughened surfaces of said ion exchange membrane are formed by concavo-convex structures having an average depth or height ranging from 0.05 to 10$\mu$ at an average number of 10 to 10$^{12}$ per mm$^2$ of the surface area.

7. The process according to claim 3, wherein said ion exchange membrane is a cation exchange membrane of a fluorinated polymer having sulfonic acid groups, carboxylic acid groups or phosphoric acid groups.

8. The process according to claim 7, wherein said ion exchange membrane has sulfonic acid groups on the anode side and carboxylic acid groups on the cathode side.

9. The process according to claim 7, wherein said ion exchange membrane is made of two kinds of polymer having carboxylic acid groups which have different ion exchange capacities.

10. The process according to claim 7, wherein said electrolysis is performed under the conditions of a concentration of an aqueous solution of an alkali metal chloride of 2.5 to 5.0 N; a temperature of 60° to 120° C.; and a current density of 10 to 100 A/dm$^2$.

* * * * *